(12) United States Patent
Nock

(10) Patent No.: US 7,194,977 B2
(45) Date of Patent: Mar. 27, 2007

(54) BIRD FEEDING APPARATUS

(75) Inventor: Robert Kenneth Nock, West Midlands (GB)

(73) Assignee: CJ Wildbird Foods Limited, Shrewsbury (GB)

( * ) Notice: Subject to any disclaimer, the term of this patent is extended or adjusted under 35 U.S.C. 154(b) by 0 days.

(21) Appl. No.: 10/859,037

(22) Filed: Jun. 2, 2004

(65) Prior Publication Data

US 2005/0011463 A1    Jan. 20, 2005

(30) Foreign Application Priority Data

Jun. 4, 2003  (GB) .................................. 0312763.6

(51) Int. Cl.
*A01K 39/01* (2006.01)
(52) U.S. Cl. ..................................... 119/52.1
(58) Field of Classification Search .............. 119/52.2, 119/51.01, 57.8, 57.9, 52.1, 52.3, 52.4, 53, 119/53.5, 54; D30/121, 124, 127, 128
See application file for complete search history.

(56) References Cited

U.S. PATENT DOCUMENTS

| | | | | |
|---|---|---|---|---|
| 3,205,860 A | * | 9/1965 | Moore ....................... | 119/52.4 |
| D352,138 S | * | 11/1994 | Tucker et al. .............. | D30/124 |
| 5,558,040 A | * | 9/1996 | Colwell et al. ............ | 119/52.2 |
| D385,067 S | * | 10/1997 | Whittles .................... | D30/124 |
| 5,699,753 A | | 12/1997 | Aldridge, III .............. | 119/52.1 |
| 5,701,842 A | * | 12/1997 | Whittles .................... | 119/52.2 |
| 5,829,384 A | | 11/1998 | Landry ....................... | 119/52.3 |
| 6,481,376 B1 | * | 11/2002 | Finklea .................... | 119/57.91 |
| 6,571,734 B1 | | 6/2003 | Finklea .................... | 119/57.91 |

FOREIGN PATENT DOCUMENTS

| | | |
|---|---|---|
| GB | 2 271 265 | 4/1994 |
| GB | 2 287 635 | 9/1995 |

* cited by examiner

*Primary Examiner*—T. Nguyen
(74) *Attorney, Agent, or Firm*—Mathews, Shepherd, McKay & Bruneau, P.A.

(57) ABSTRACT

Bird feeding apparatus comprising a main body that provides access to bird food and a base member having a plurality of shedding faces which are inclined so that a bed of food particles in the main body settling under gravity is shed towards feeding ports located proximal the periphery of the base; where each shedding face has at least two mutually inclined substantially flat surfaces that together form a valley the floor of which descends as it approaches the periphery of the base.

7 Claims, 7 Drawing Sheets

BIRD FEEDING APPARATUS

BACKGROUND OF INVENTION

Bird feeding apparatus typically comprise a tubular shaped main body used to store bird feed; this body having feed ports located near the lower end. Often a base member engages the lower end of the main body. Typically, this base member supports perches that extend therefrom. The base member may be generally conical in shape or have a centrally upwardly extending plug. It is known for this plug to comprise a pair of shedding faces; each shedding face being formed from a single inclined flat surface or a single surface with a concave recess. The concave surface may have a drainage channel to assist removal of rainwater and the like that would otherwise lead to deterioration of the bird feed.

The use of a concave shedding face improves distribution of feed to the feeding ports and helps avoid dead spots; where food may remain between refilling and so may go bad. Base members with concave shedding faces as described above will, in use, not normally allow water to drain from the faces if the longitudinal axis of the birdfeeder body is inclined at a angle of more than a 10° or so to the vertical; even when such surfaces are provided with a drainage channel.

BRIEF SUMMARY OF INVENTION

An aim of the present invention is to provide improved bird feeding apparatus. Further aims of the invention are to provide a base member that more effectively directs bird food to feeding ports and also that more effectively allows rainwater and the like to drain from the base.

In one aspect the invention comprises bird feeding apparatus comprising a main body that provides access to bird food and a base member wherein the base member has a plurality of shedding faces which are inclined to effect shedding of food particles under gravity towards a feeding port or ports located proximal the periphery of the base; characterised in that each shedding face comprises at least two mutually inclined substantially flat surfaces that together form a first valley the floor of which descends as it approaches the periphery of the base.

Preferably, the base has a plurality of shedding faces and wherein individual shedding faces intersect with one another to form a plurality of ridges; each ridge sloping downwardly in a direction towards the centre of the base member.

Each shedding face may comprise a further flat side surface between at least one substantially flat inclined surface and the periphery of the base; preferably, each shedding face comprises two further side surfaces; each side surface being located between an inclined substantially flat surface and the periphery of the base.

The base and the main body may be substantially circular in cross section, in which case the side surface in plan view is substantially the shape of part of an annulus. Preferably, the side surfaces together form a second valley that is a continuation of the first valley. The floor of the second valley may be substantially horizontal. The second valley may haves a drainage channel that allows water to exit the feeder base via a drainage channel but generally does not permit feed to pass therethrough. Typically the base has two or three shedding surfaces.

In another aspect the invention comprises bird feeding apparatus having a main body with at least one feeding port that provides access to bird food, and a base member, wherein the base member has a plurality of shedding faces, individual shedding faces being inclined one to another to effect shedding of food particles under gravity towards the feeding port or ports located proximal the periphery of the base; wherein each shedding face comprises at least two mutually inclined substantially flat surfaces that together form a first valley the floor of which descends as it approaches the periphery of the base; and wherein individual shedding faces intersect one to another to form a plurality of ridges; each ridge sloping downwardly in a direction towards the centre of the base member.

BRIEF DESCRIPTION OF DRAWINGS

The invention will now be described by reference to the following diagramatic illustrations in which:

FIGS. 4a and 4b show cross sections along the lines X—X and Y—Y respectively of FIG. 3a;

FIGS. 7a and 7b show cross sections along the lines A—A and B—B respectively of FIG. 6a.

DETAILED DESCRIPTION OF INVENTION

Figure 1:
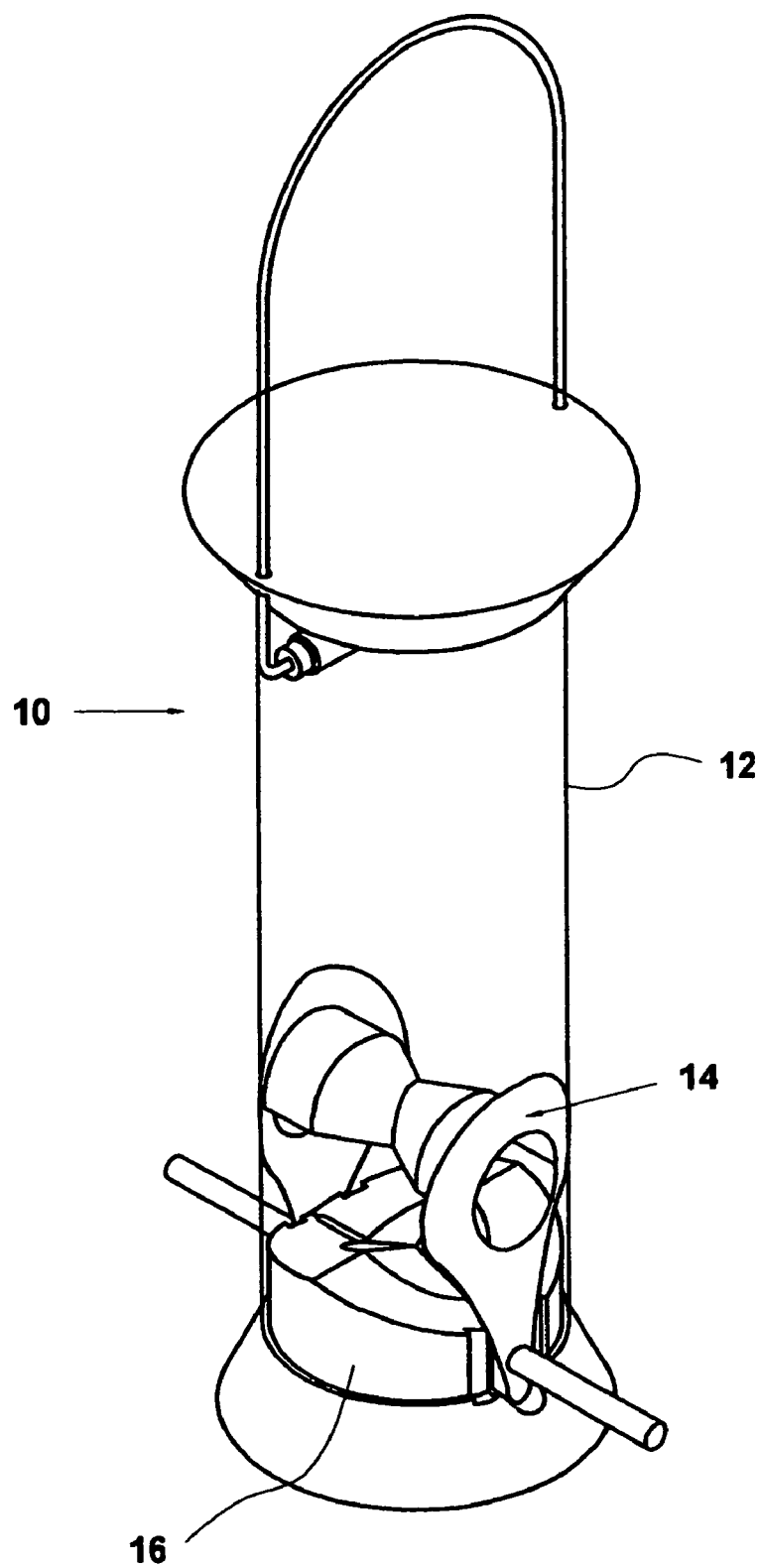
FIG. 1 shows a perspective view of a birdfeeder according to the invention.
Figure 2:
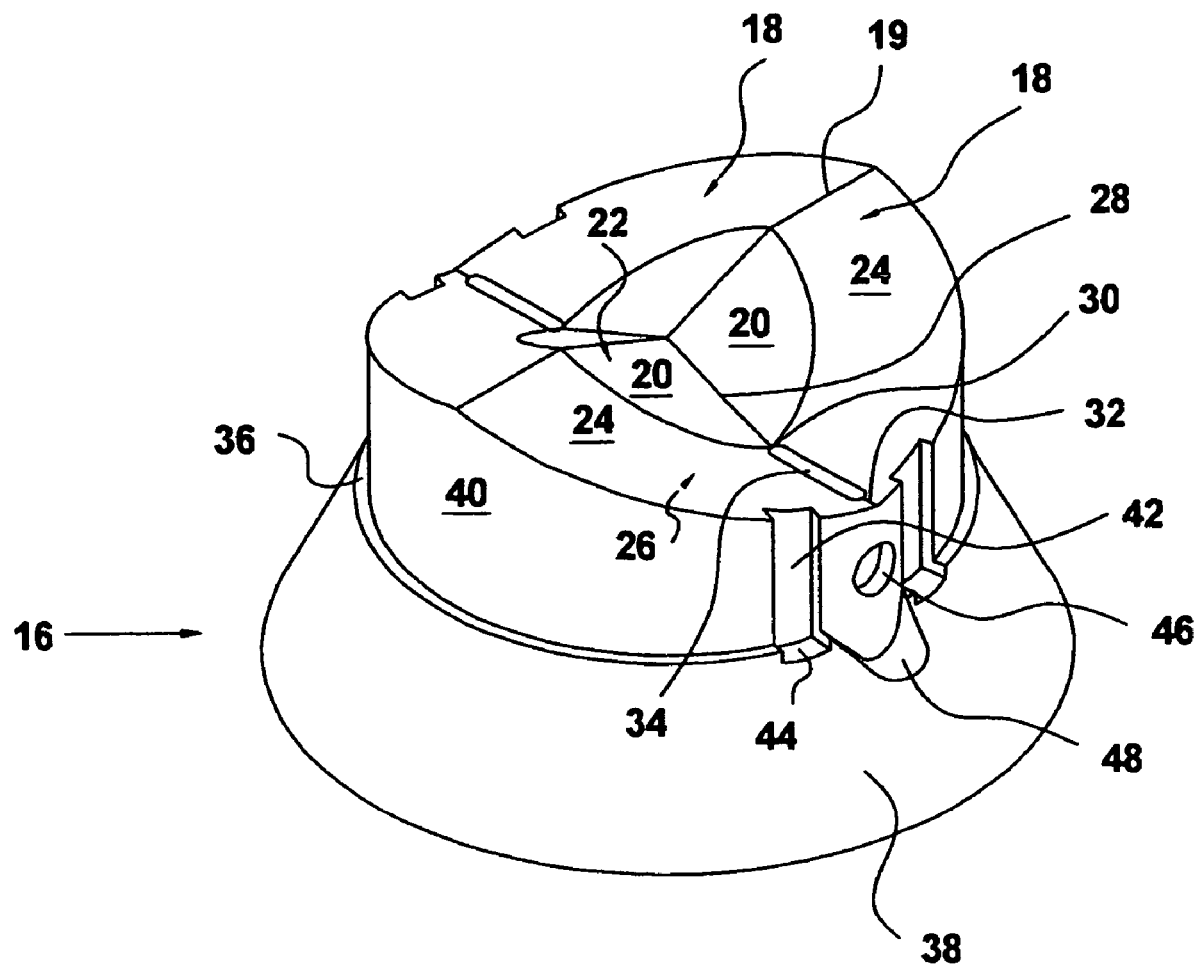
FIG. 2 shows a perspective view of a base member of the birdfeeder of FIG. 1.

A first embodiment of the invention will now be described by reference to FIGS. 1 to 4. A birdfeeder 10 comprises a tubular main body 12 with feeding ports 14 near its lower end and a base member 16 that engages the lower end of main body 12.

Base member 16 (see FIGS. 2 and 3) has a pair of shedding faces 18 separated by a ridge 19 extending substantially diametrically across the top of base member 16. Each shedding face 18 comprises four surfaces; two mutually inclined substantially flat surfaces 20 that together form a "first valley" 22 and partly annular shaped side surfaces 24 that together form a "second valley" 26. The floor 28 of the first valley 22 slopes downwardly in its travel from the centre of the base towards the periphery of the base. The lowest point 30 of floor of the first valley 22 is coterminous with the highest point 30 of the floor 32 of the second valley 26. The floor 32 of the second valley is preferably substantially horizontal but may also slope downwardly in a direction towards the periphery of the base. Secondary valley 26 has a slot 34 that prevents rainwater accumulating at the bottom of the shedding face by allowing it to drain through a lower frustro-conical portion 38 of the base member 16 to the surroundings.

Rim 36 located between lower frustro-conical base portion 38 and the upper generally cylindrical portion 40 of the base is provided to assist engagement of the base member 16 and the tubular main body 12. Base member 16 is also provided with vertical slots 42 that allow water to drain therethrough to the surroundings. Slots 42 allow rainwater to be discharged via recesses 44 located at the bottom end of the slots and extending below rim 36 into the lower base portion 38 and therefore also extending below the bottom end of the tubular main body 12. Recesses 46 and 48 are provided in the peripheral wall of the base member in order to interface with the rear surface (not shown) of feeding ports 14.

Figure 3A:
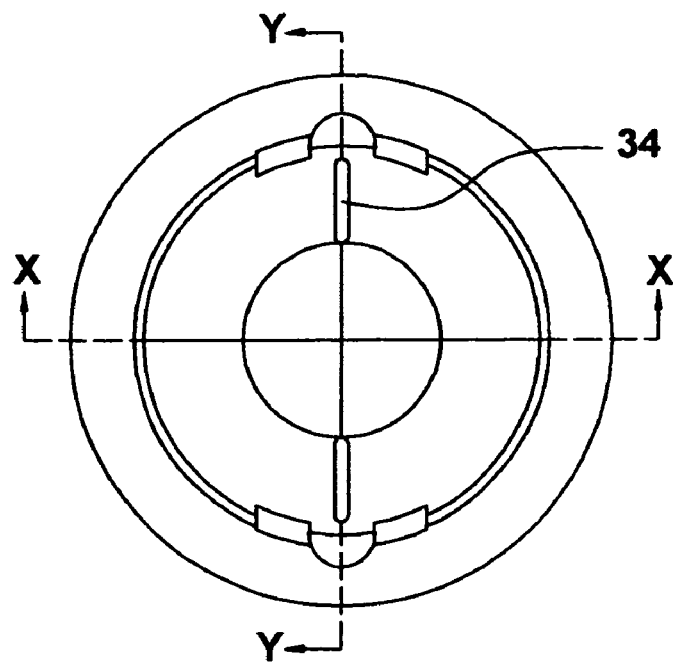
FIGS. 3a, 3b and 3c show a plan and side views respectively of the base member of FIG. 2.
Figure 3B:
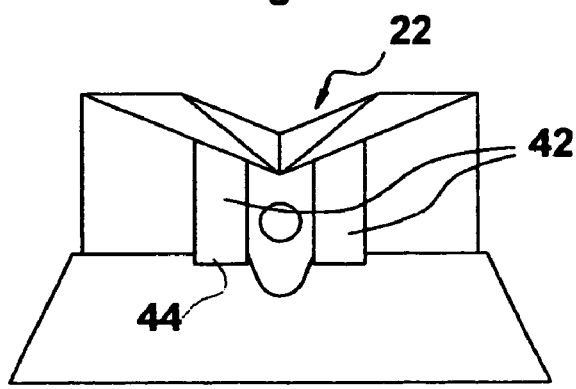
Figure 3C:
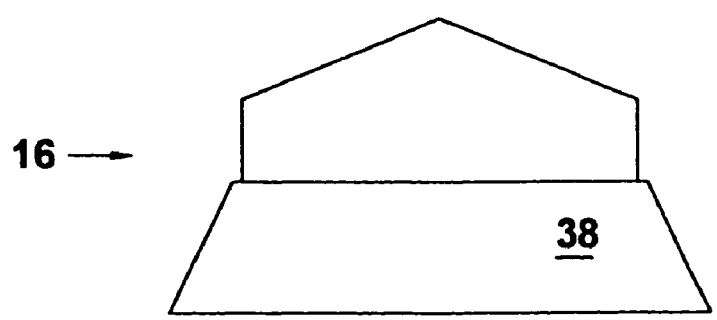
Figure 4A:
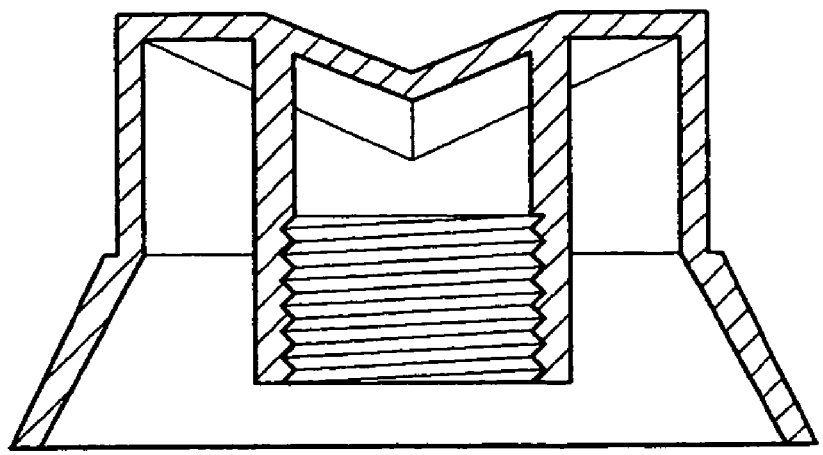
Figure 4B:
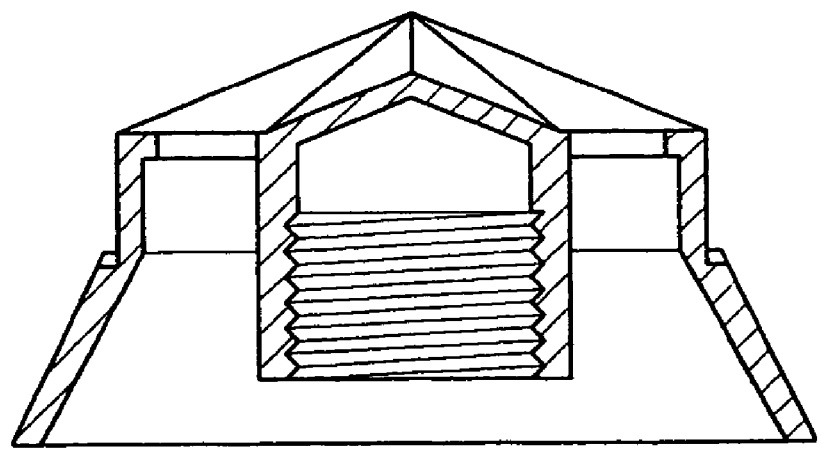

FIGS. 4*a* and 4*b* show cross sections along the lines X—X and Y—Y respectively of FIG. 3*a*. In this embodiment ridge 19 is horizontal. Floor 32 of the second valley is also horizontal and side surfaces 24 take the form of a partial spiral ramp.

Figure 5:
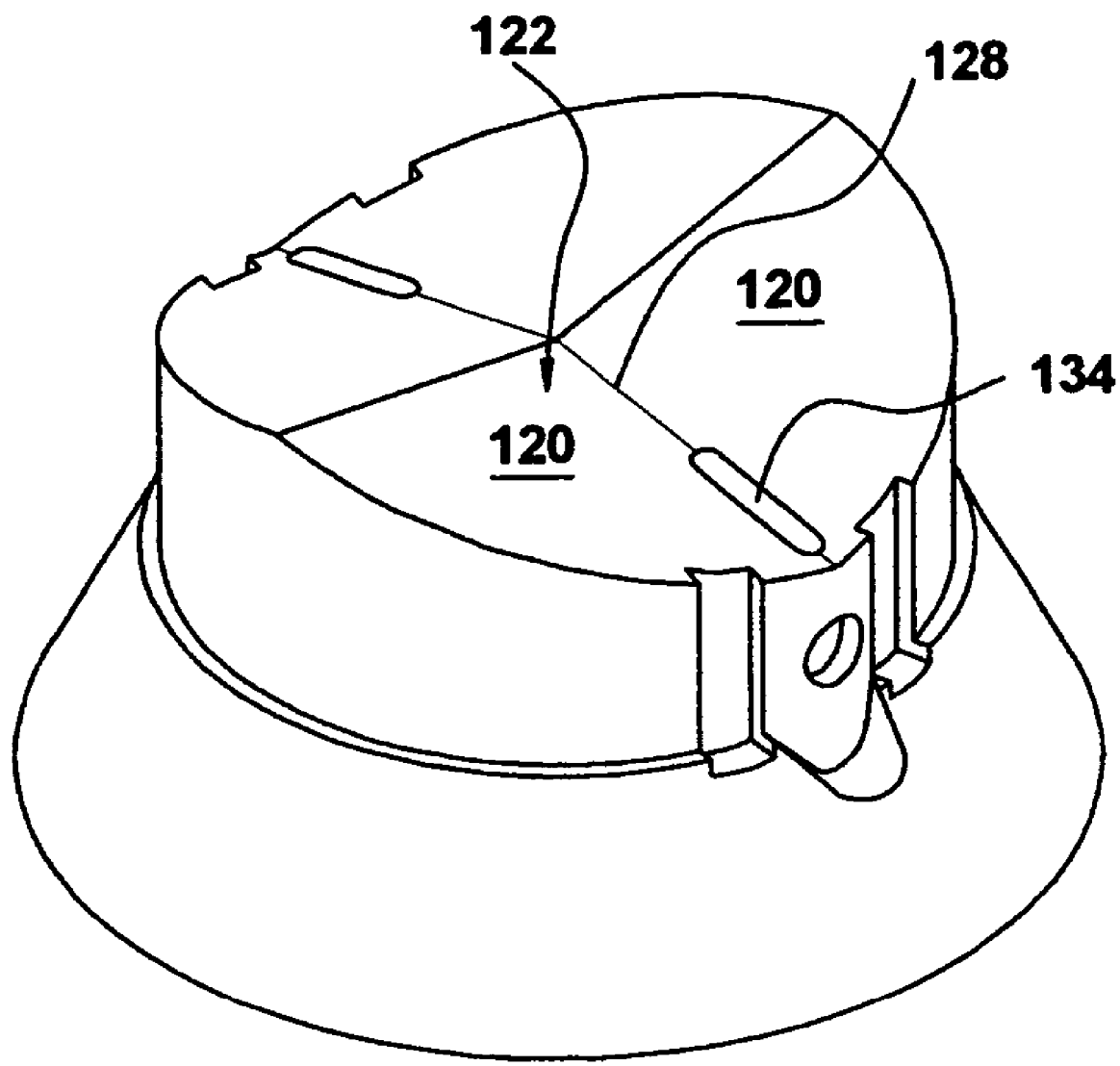
FIG. 5 shows a perspective view of a further embodiment of the invention.
Figure 6A:
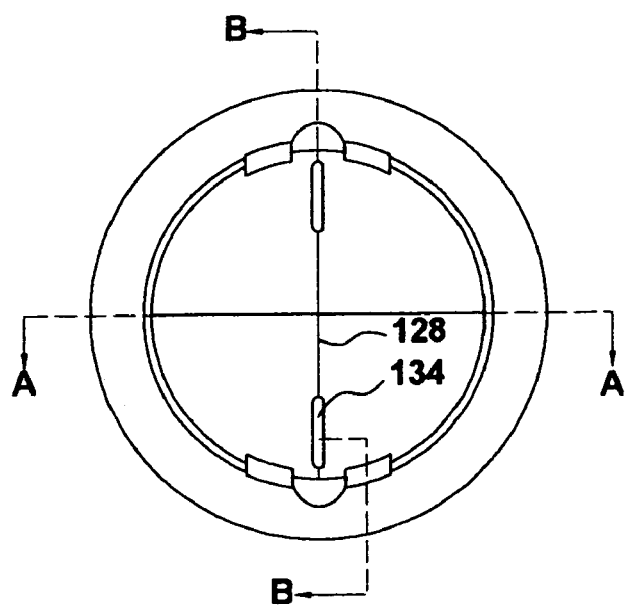
FIGS. 6a, 6b, 6d and 6c show a top view, side views and an underside view respectively of the base member of FIG. 5.
Figure 6B:
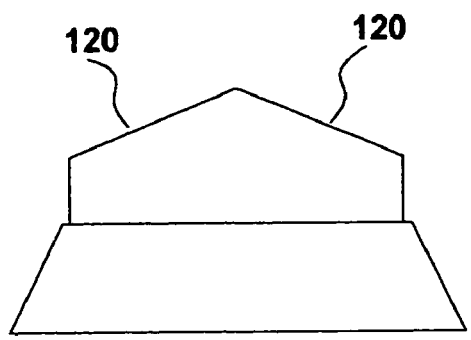
Figure 6C:
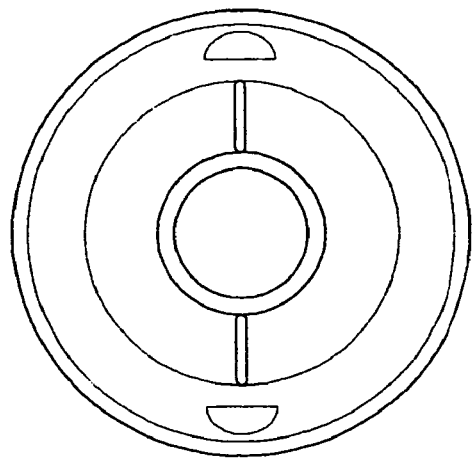
Figure 6D:
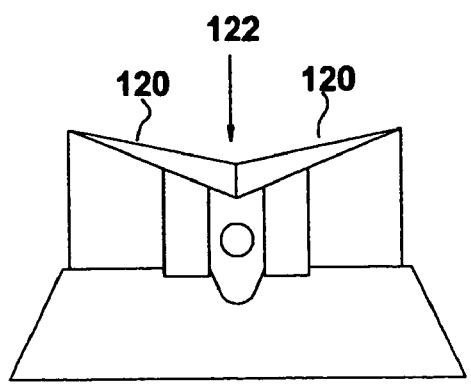
Figure 7A:
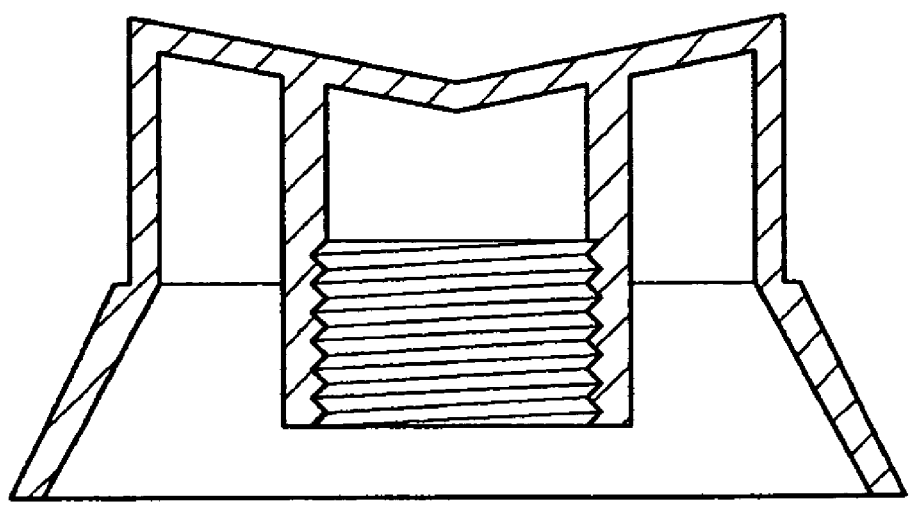
Figure 7B:
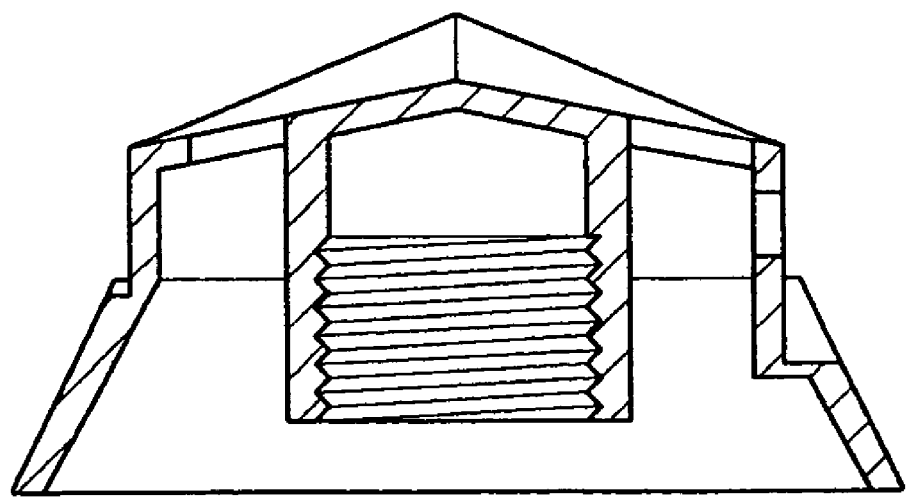

A second embodiment of the invention is shown in FIGS. 5 to 7. This is similar to the first embodiment described above; the essential difference being that in this embodiment there are no side surfaces, and so no second valley; but just a pair of mutually inclined substantially flat surfaces 120. In this embodiment drainage slot 134 is located in the downwardly facing floor 128 of first valley 122.

There will normally be a shedding face for each feeding port. For example a tubular main body 12 with three feeding ports 14 would be provided with a base member 16 having three shedding faces. This ensures that bird feed is directed specifically towards each feed port.

While it is preferred that the main body and base have a circular shape as viewed from above (see FIGS. 3*a* and 6*a*) other shapes are possible; for example, they may be elliptical, square, pentagonal, hexagonal or rectangular in shape.

I claim:

1. Bird feeding apparatus with a base member having an upper surface comprising two shedding faces; each shedding face comprising two mutually inclined substantially flat surfaces that together form a first valley the floor of which descends as it approaches the periphery of the base member; wherein each shedding face further comprises two side surfaces located between said substantially flat surfaces and the periphery of the base and where said side surfaces together form a second valley that is a continuation of the first valley; and wherein said substantially flat surfaces of each shedding face together form two ridges that slope downwardly in a direction towards the center of the base member.

2. Bird feeding apparatus according to claim 1 wherein the base and the main body are substantially circular in cross section.

3. Bird feeding apparatus according to claim 1 wherein said side surfaces in plan view are substantially the shape of part of an annulus.

4. Bird feeding apparatus according to claim 1 wherein the floor of the second valley is substantially horizontal.

5. Bird feeding apparatus according to claim 1 where said second valley has a drainage channel that allows water to exit the feeder base via said drainage channel but generally does not permit feed to pass therethrough.

6. Bird feeding apparatus according to claim 5 wherein the drainage channel extends in a radial direction from the longitudinal axis of the birdfeeder.

7. Bird feeding apparatus according to claim 1 wherein the base has a drainage channel at its periphery comprising a slot that in use extends inside the main body and below the end of the main body to allow drainage of water from a shedding surface to the surroundings.

\* \* \* \* \*